US005726701A

United States Patent [19]

Needham

[11] Patent Number: 5,726,701

[45] Date of Patent: Mar. 10, 1998

[54] METHOD AND APPARATUS FOR STIMULATING THE RESPONSES OF A PHYSICALLY-DISTRIBUTED AUDIENCE

[75] Inventor: Bradford H. Needham, Hillsboro, Oreg.

[73] Assignee: Intel Corporation, Santa Clara, Calif.

[21] Appl. No.: 735,047

[22] Filed: Oct. 22, 1996

Related U.S. Application Data

[63] Continuation of Ser. No. 425,373, Apr. 20, 1995, abandoned.

[51] Int. Cl.[6] ........ H04N 7/00

[52] U.S. Cl. ........ 348/2; 348/13; 455/2

[58] Field of Search ........ 348/2–13, 14; 455/2; 434/350, 351, 322, 323, 352; H04N 7/00, 7/10

[56] References Cited

U.S. PATENT DOCUMENTS

| | | | |
|---|---|---|---|
| 4,107,735 | 8/1978 | Frohback | 348/13 |
| 4,926,255 | 5/1990 | Van Kohorn | 348/13 |
| 5,204,768 | 4/1993 | Tsakiris et al. | 359/148 |
| 5,273,437 | 12/1993 | Caldwell et al. | 434/351 |

OTHER PUBLICATIONS

Ellen A. Isaacs, et al., "Forum for Supporting Interactive Presentations to Distributed Audiences", ACM 1994 Conference On Computer Supported Cooperative Work, Oct. 1994, pp. 405–416.

*Primary Examiner*—Michael H. Lee
*Attorney, Agent, or Firm*—Blakely, Sokoloff, Taylor & Zafman

[57] ABSTRACT

A response metric which indicates the response of an audience member(s) is first generated and transferred to the system which is broadcasting the presentation. The broadcast system uses the response metric to generate a combined response metric. The broadcast system then generates an audio feedback by activating a response synthesizer(s) based on this combined response metric. In one embodiment, the broadcast system generates the combined response metric by combining response metrics received from multiple audience systems. In an alternate embodiment, each audience system generates the audio feedback locally. In one embodiment, the audience response being synthesized is applause.

20 Claims, 7 Drawing Sheets

METHOD AND APPARATUS FOR STIMULATING THE RESPONSES OF A PHYSICALLY-DISTRIBUTED AUDIENCE

This is a continuation of application Ser. No. 08/425,373, filed Apr. 20, 1995, now abandoned.

BACKGROUND OF THE INVENTION

1. Field of the Invention

The present invention pertains to data transfer between computer systems. More particularly, this invention relates to providing audience response data in a physically-distributed environment.

2. Background

With the modern advancement of computer technology has come the development of video conferencing technology. Video conferencing refers to multiple individuals communicating with one another via one or more physically-distributed computer systems. Generally, visual and possibly audio data are transferred between the systems. Typically, the computer systems of a video conferencing system are connected via a telephone or similar line.

One situation where video conferencing is used is that of a "one-to-many" meeting. A one-to-many meeting is a situation where a presenting individual using a single system broadcasts data to multiple audience systems, such as in a presentation or speech. A one-to many meeting can be very beneficial, allowing the presenter to access a large audience without requiring the audience to be in the same physical location as the presenter.

Several problems, however, can arise in systems which support a one-to-many meeting. One such problem is that of audience response and feedback. In situations where there are multiple audience systems, many video conferencing systems cannot support continuous exact audio responses from all audience members. That is, the broadcasting system does not have sufficient computing power to accurately interpret audio input from all systems as well as provide video images in real time. Audience response, however, is very useful to individual presenters. For example, it can be very uncomfortable for an individual to give a speech to a group of people without hearing any laughter after a joke or applause at the anticipated times. Thus, it would be beneficial to provide a system which gives presenting individuals feedback from their audience.

Additionally, transferring video images requires a significant amount of bandwidth in the communication line. The necessary bandwidth for video conferencing typically ranges between twenty kilobits per second and one megabit per second, depending on the system being used and the quality of the video images being transferred. Therefore, in many instances very little bandwidth is available for the audience systems to return information to the broadcasting system. Thus, it would be beneficial to provide a low-bandwidth method for providing feedback to a presenting individual.

Additionally, in systems where multiple audience members are physically dispersed, it is frequently difficult to provide the different audience locations with the responses of other locations. Without such responses, individuals do not know other audience members' feelings toward the presentation. For example, an individual listening to a speech at his or her desk does not know the responses generated by other individuals sitting at their desks. This can be detrimental because many times, audience response to ideas or information being presented is as important to other audience members as it is to the presenter. Thus, it would be beneficial to provide a system which gives physically dispersed audience members the responses of their fellow members.

The present invention provides for these and other advantageous results.

SUMMARY OF THE INVENTION

A method and apparatus for simulating the responses of a physically-distributed audience is described herein. First, a response metric is generated which indicates the response of an audience member(s). This response metric is then transferred to the system which is broadcasting the presentation. The broadcast system uses the response metric to generate a combined response metric. The broadcast system then generates an audio feedback by activating a response synthesizer(s) based on this combined response metric. In one embodiment, the broadcast system generates the combined response metric by combining response metrics received from multiple audience systems. In an alternate embodiment, each audience system generates the audio feedback locally. In one embodiment, the audience response being synthesized is applause.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
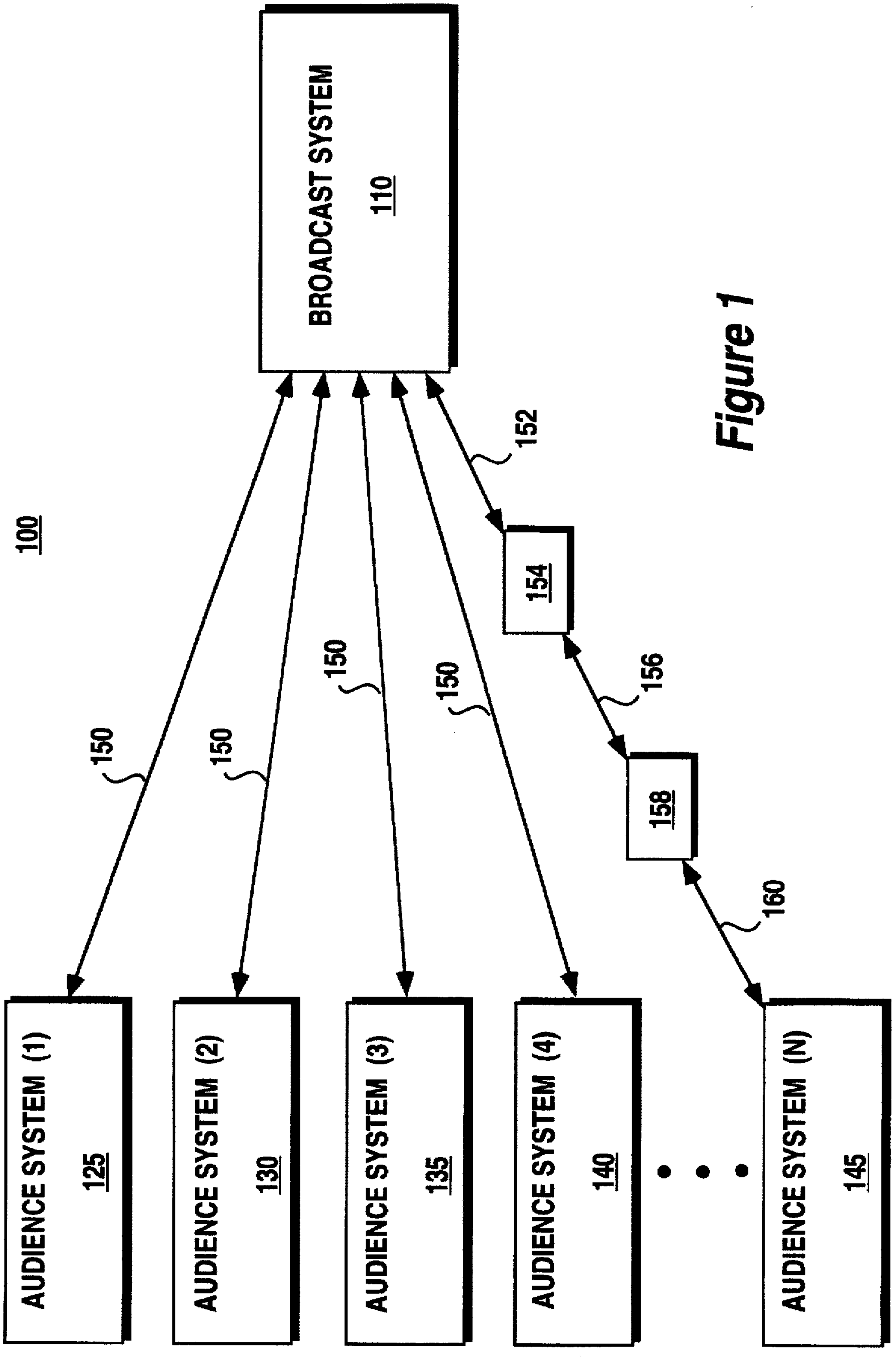
FIG. 1 shows an example of a physically-distributed conferencing environment which can be used with the present invention.

FIG. 1 shows an example of a physically-distributed conferencing environment which can be used with the present invention. FIG. 1 shows a conferencing system 100 which includes a broadcast or presentation system 110. Broadcast system 110 can be any of a wide variety of conventional computer systems.

Broadcast system 110 transmits broadcast signals to multiple audience systems via one or more communication links. These broadcast signals represent a presentation being made to the individuals at the audience systems. Conferencing system 100 is shown comprising N audience systems: audience system (1) 125, audience system (2) 130, audience system (3) 135, audience system (4) 140 and audience system (N) 145. Each of the N audience systems can be any of a wide variety of conventional computer systems. Alternatively, an audience system can be a network of computer systems. For example, an audience system may comprise multiple computer systems coupled together via a local area network (LAN).

In one embodiment of the present invention, each of the N audience systems is physically-distributed. That is, each of the audience systems is physically separate from the others. This separation can be of any distance. For example, audience systems may be separated by being on different desks in the same office, in different offices of the same building, or in different parts of the world.

It is to be appreciated that although the audience systems may be physically-distributed, multiple audience members may view and/or listen to a presentation from the same audience system. For example, an audience system may comprise multiple display devices and audio output devices situated around a lecture room which can seat hundreds of individuals.

Broadcast signals are transferred from broadcast system 110 to each of the audience systems 125–145 via communication links 150. Each communication link 150 can be any one or more of a wide variety of conventional communication media. For example, each communication link 150 can be an Ethernet cable, a telephone line or a fiber optic line. In addition, each communication link 150 can be a wireless communication medium, such as signals propagating in the infrared or radio frequencies.

Additionally, each communication link 150 can be a combination of communication media and can include converting devices for changing the form of the signal based on the communication media being used. For example, a communication link may have as a first portion an Ethernet cable 152. The broadcast signal is placed on Ethernet cable 152 by broadcast system 110 where it propagates to a converting device 154. Converting device 154 receives the signals from Ethernet cable 152 and re-transmits the signals on another medium. In one embodiment, converting device 154 is a conventional computer modem which transmits signals onto a conventional telephone line 156. The broadcast signals are then transferred to a second converting device 158. The second converting device 158 is a second modem which receives the signals from telephone line 156 and then converts them to the appropriate logical signals for transmission on Ethernet cable 160. The broadcast signals then propagate along Ethernet cable 160 to audience system 145.

Figure 2:
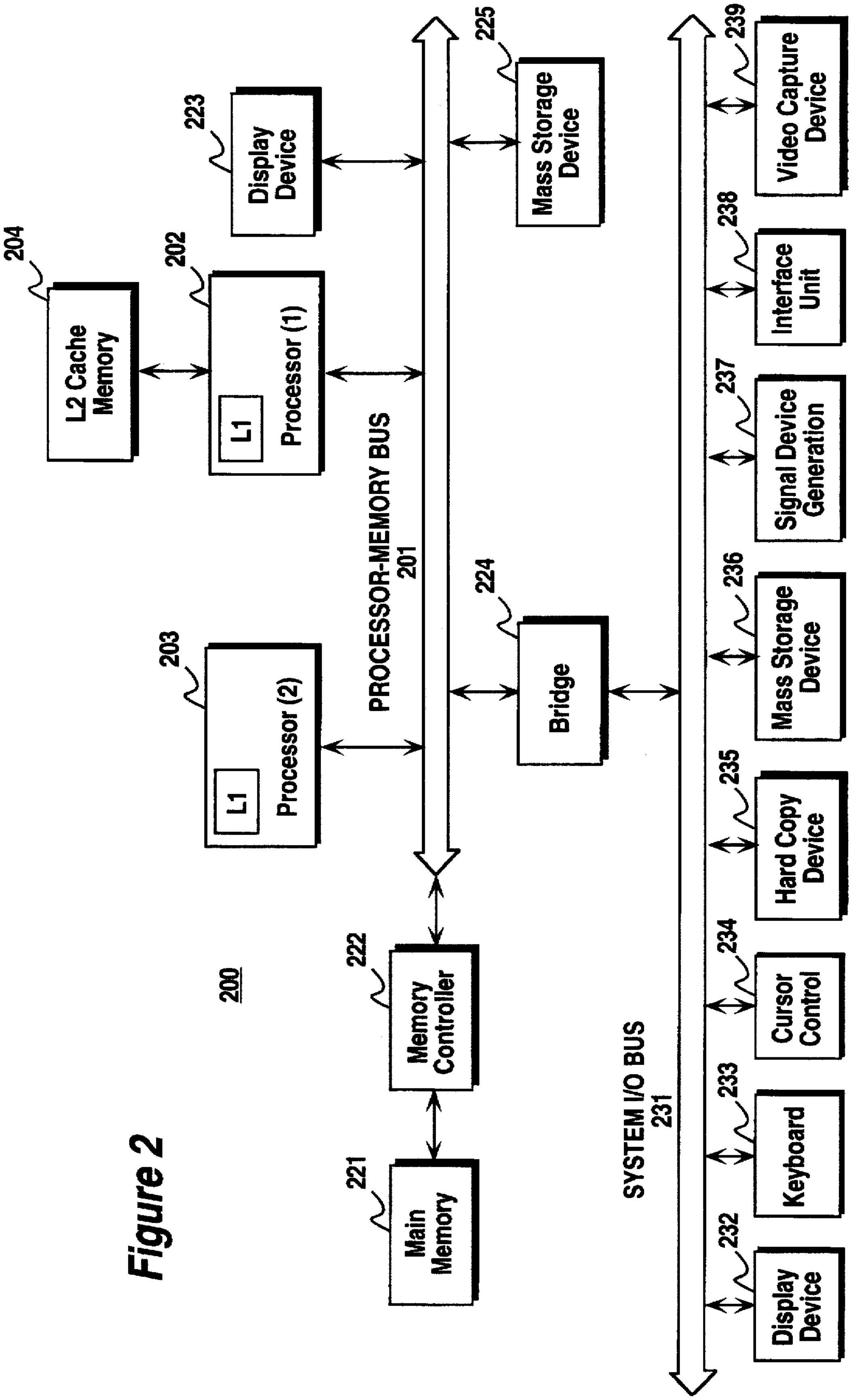
FIG. 2 shows an overview of a computer system which is used by one embodiment of the present invention.

FIG. 2 shows an overview of a computer system which is used by one embodiment of the present invention. The computer system 200 generally comprises a processor-memory bus or other communication means 201 for communicating information between one or more processors 202 and 203. Processor-memory bus 201 includes address, data and control buses and is coupled to multiple devices or agents. Processors 202 and 203 may include a small, extremely fast internal cache memory, commonly referred to as a level one (L1) cache memory for temporarily storing data and instructions on-chip. In addition, a bigger, slower level two (L2) cache memory 204 can be coupled to processor 202 for temporarily storing data and instructions for use by processor 202. In one embodiment, processors 202 and 203 are Intel® architecture compatible microprocessors; however, the present invention may utilize any type of microprocessor, including different types of processors.

Also coupled to processor-memory bus 201 is processor 203 for processing information in conjunction with processor 202. Processor 203 may comprise a parallel processor, such as a processor similar to or the same as processor 202. Alternatively, processor 203 may comprise a co-processor, such as a digital signal processor. The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processor 202 and processor 203. A mass data storage device 225, such as a magnetic disk and disk drive, for storing information and instructions, and a display device 223, such as a cathode ray tube (CRT), liquid crystal display (LCD), etc., for displaying information to the computer user are coupled to processor-memory bus 201.

An input/output (I/O) bridge 224 is coupled to processor-memory bus 201 and system I/O bus 231 to provide a communication path or gateway for devices on either processor-memory bus 201 or I/O bus 231 to access or transfer data between devices on the other bus. Essentially, bridge 224 is an interface between the system I/O bus 231 and the processor-memory bus 201.

System I/O bus 231 communicates information between peripheral devices in the computer system. In one embodiment, system I/O bus 231 is a Peripheral Component Interconnect (PCI) bus. Devices that may be coupled to system I/O bus 231 include a display device 232, such as a cathode ray tube, liquid crystal display, etc., an alphanumeric input device 233 including alphanumeric and other keys, etc., for communicating information and command selections to other devices in the computer system (for example, processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions, and a signal generation device 237 may also be coupled to system I/O bus 231.

In one embodiment of the present invention, the signal generation device 237 includes, as an input device, a standard microphone to input audio or voice data to be processed by the computer system. The signal generation device 237 includes an analog to digital converter to transform analog audio data to digital form which can be processed by the computer system. The signal generation device 237 also includes, as an output, a standard speaker for realizing the output audio from input signals from the computer system. Signal generation device 237 also includes well known audio processing hardware to transform digital audio data to audio signals for output to the speaker, thus creating an audible output.

An interface unit 238 is also coupled with system I/O bus 231. Interface unit 238 allows system 200 to communicate with other computer systems. In one embodiment, interface unit 238 is a conventional network adapter, such as an Ethernet adapter. Alternatively, interface unit 238 could be a modem or any of a wide variety of other communication devices.

The display device 232 used with the computer system and the present invention may be a liquid crystal device, cathode ray tube, or other display device suitable for creating graphic images and alphanumeric characters (and ideographic character sets) recognizable to the user. The cursor control device 234 allows the computer user to dynamically signal the two dimensional movement of a visible symbol (pointer) on a display screen of the display device 232. Many implementations of the cursor control device are known in the art including a trackball, mouse, joystick or special keys on the alphanumeric input device 233 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

In one embodiment of the present invention, a video capture device 239 is also coupled to the system I/O bus 231. Video capture device 239 receives input video signals and outputs the video signals to display device 232. In one implementation, video capture device 239 also contains data compression and decompression software. Data compression may be used, for example, to compress data prior to storing the data (if storage is desired). Data decompression software may be used, for example, to decompress video images which are received by video capture device 239.

Certain implementations of the present invention may include additional processors or other components. Additionally, certain implementations of the present invention may not require nor include all of the above components. For example, processor 203, display device 223, or mass storage device 225 may not be coupled to processor-memory bus 201. Furthermore, the peripheral devices shown coupled to system I/O bus 231 may be coupled to processor memory bus 201; in addition, in some implementations only a single bus may exist with the processors 202 and 203, memory controller 222, and peripheral devices 232 through 239 coupled to the single bus.

Figure 3:
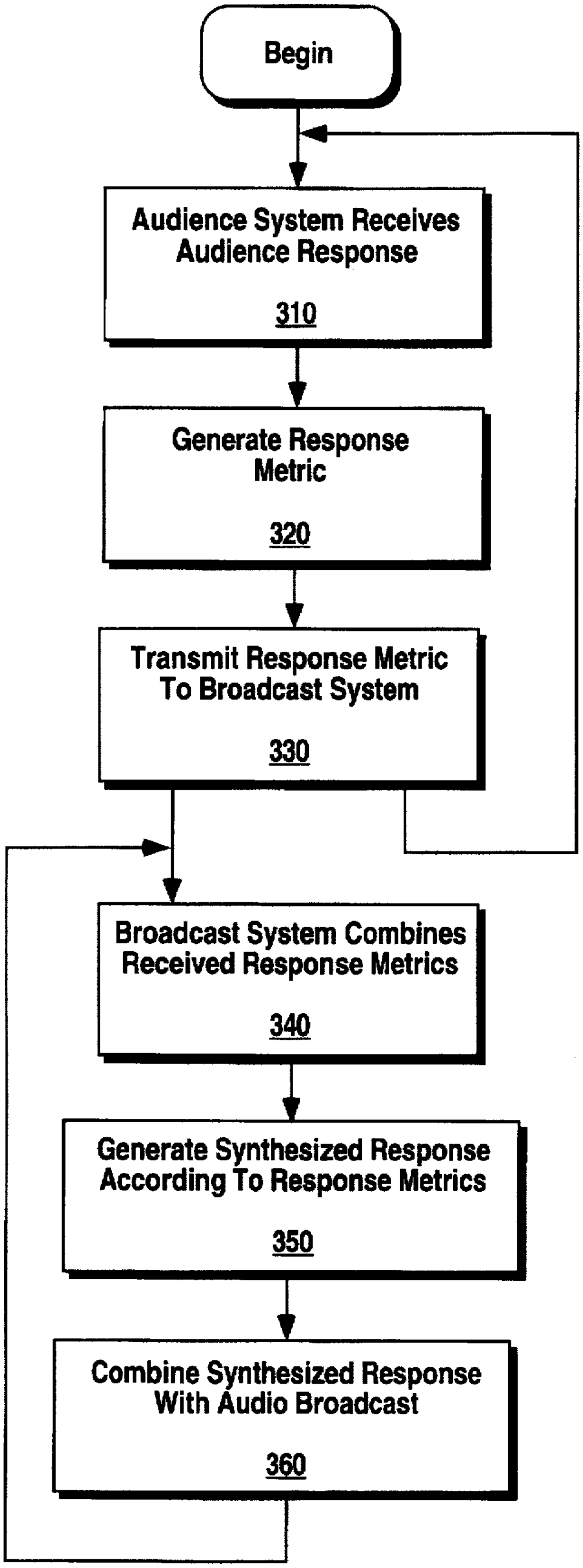
FIG. 3 is a flowchart showing the steps followed in simulating audience responses according to one embodiment of the present invention.

FIG. 3 is a flowchart showing the steps followed in simulating audience responses according to one embodiment of the present invention. As discussed above with respect to FIG. 1, a presentation is broadcast to one or more audience systems. Typically, once a presentation has begun, audience member(s) observing the presentation at an audience system will respond to the presentation. These responses include, for example, laughter, applause, cheers, boos, hisses, etc. Responses by audience members are received by the audience system(s) in step 310.

In one embodiment of the present invention, audience responses are input to the audience system audibly. That is, the audience system determines the existence of an audience response based on audio signals which are input to the audience system. One method of determining an audience response is discussed in more detail below with reference to FIG. 4.

In an alternate embodiment, audience responses are input to the audience system manually. In one implementation, responses are input using a dial, a sliding scale or a similar device. A separate dial may be used to represent each type of response, or the same dial may be used for the same responses. For example, one dial may be labeled "laughter" while another dial is labeled "applause". By way of another example, the dial may simply represent positive response, rather than a specific type of response. By way of another example, a switch may be set on the box to indicate whether the dial is currently representing applause or laughter. Maximum response is indicated by setting a dial at its maximum level, while no response is indicated by setting the dial at its minimum level. Intermediate response levels are indicated by setting the dial at intermediate points.

In another implementation, audience responses are input via a graphical user interface (GUI) on the audience system. The GUI can provide, for example, graphical representations of sliding scales for different responses, such as laughter, applause, or boos. These scales can then be adjusted by an audience member by, for example, utilizing a mouse or other cursor control device.

Once the audience response is input to the audience system, the audience system generates a low-bandwidth response metric based on the input received, step 320. The response metric is a value which indicates the level of the response. In one embodiment, the response metric is a single number indicating an average number of claps per second.

The response metric is then transmitted to the broadcast system, step 330. The audience system then repeats steps 310 through 330 to generate another response metric to transmit to the broadcast system, thereby resulting in periodic transmission of a response metric to the broadcast system. In one embodiment, a response metric is transmitted to the broadcast system every 300 ms. In one implementation, the periodic rate for transmission of response metrics can be generated empirically by balancing the available bandwidth of the communication medium against the desire to reduce the time delay in providing feedback to the speaker at the broadcast system. In one embodiment, a response metric is transmitted to the broadcast system for each type of response supported by the system, such as laughter, applause, boos, cheers, etc.

Thus, the audience system periodically transmits audience responses to the broadcast system in a low-bandwidth manner. By generating a response metric, the audience system eliminates the burden on the communication link of transferring a digitized waveform of all received sounds. Therefore, the bandwidth of the communication links can be devoted almost entirely to transmitting the presentation from the broadcast system. Furthermore, the response recognition is done at each audience system, thereby alleviating the burden on the broadcast system of recognizing the responses.

The broadcast system then combines the response metrics from each audience system coupled to the broadcast system, step 340. In one embodiment, this combining is a summation process. That is, the broadcast system adds together all of the received response metrics to generate a single combined response metric which is the summation of all received response metrics. In an alternate embodiment, this combining is an averaging process. That is, the broadcast system averages together all of the received response metrics to generate a single combined response metric.

The combining of received response metrics is performed periodically by the broadcast system. In one embodiment, the broadcast system receives response metrics from each audience system concurrently and performs the combining when the metrics are received. In an alternate embodiment, the broadcast system stores the current response metric from each audience system and updates the stored response metric for an audience system each time a new response metric is input from that audience system. Thus, in this alternate embodiment, the broadcast system need not time the generation of the combined response metrics to correspond with receipt of individual response metrics from the audience systems.

In one embodiment of the present invention, a different response metric is received from an audience system for each type of response which is recognized by the audience system. The broadcast system generates a combined response metric for each of these different types of response metrics.

Once a combined response metric is generated, the broadcast system generates a synthesized response according to the combined response metric, step 350. The synthesized response generated is dependent on the type of response received. In one embodiment of the present invention, the audience systems generate response metrics for applause; thus, the broadcast system generates synthesized applause. In one embodiment, the synthesized response is generated by activating multiple response synthesizers, as discussed in more detail below with reference to FIG. 7.

The synthesized response is then combined with the presentation at the broadcast system and transmitted as part of the presentation, step 360. In one embodiment, this combining is done by audibly outputting the synthesized response. Thus, the response is made available for both the presenter and the audience members to hear.

The broadcast system then repeats steps 340 to 360 to generate additional synthesized responses in accordance with response metrics received from the audience systems.

In an alternate embodiment of the present invention, each audience system periodically transmits response metrics to all other audience systems as well as the broadcast system. This embodiment is particularly useful in LAN environments which allow multicasting (that is, transmitting information to multiple receiving systems simultaneously). In this embodiment, each of the audience systems then generates a combined response metric and a synthesized response based on the combined response metric in the same manner as done by the broadcast system discussed above. Thus, in this embodiment each audience system generates an audio output locally, thereby reducing the time delay between the actual response and the synthesized output of the response.

Figure 4:
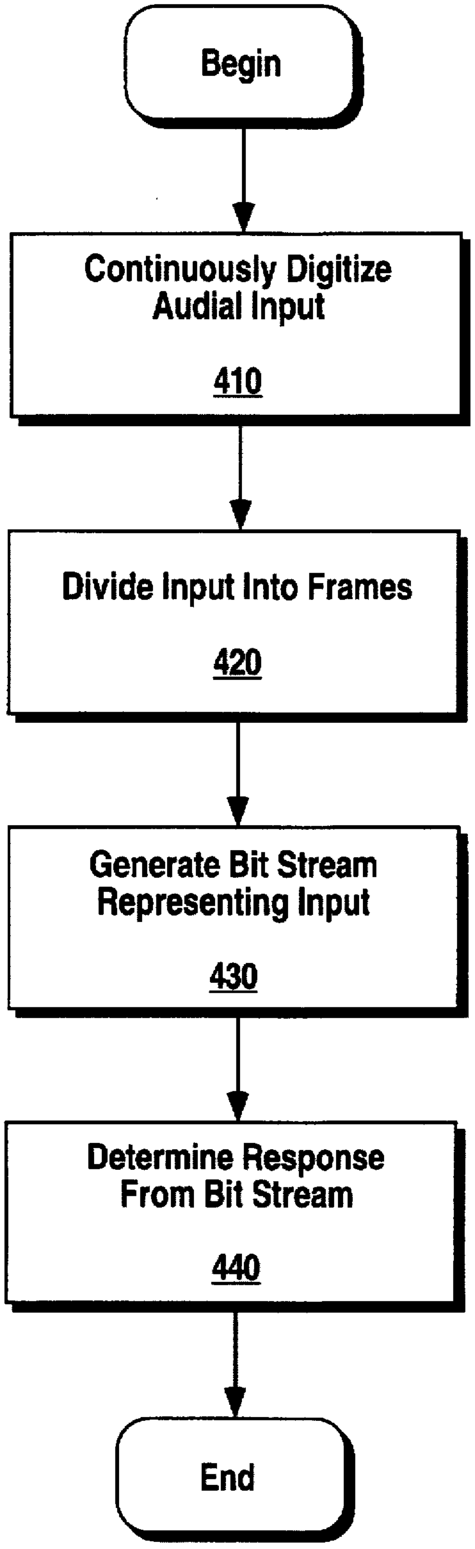
FIG. 4 is a flowchart showing the steps followed in determining audience response according to one embodiment of the present invention.

FIG. 4 is a flowchart showing the steps followed in determining audience response according to one embodiment of the present invention. In the embodiment shown and discussed in FIGS. 4, 5 and 6 below, the audience response being received and synthesized is applause. However, it is to be appreciated that the present invention is not limited to applause generation, and the discussions below apply analogously to other types of audience response.

The audience response is input to the audience system and is continuously digitized, step 410. In this embodiment, the audience response is input using a microphone coupled to the audience system. The audience system receives all sounds which are received by the microphone, including applause as well as other background or similar noise. The digitization of input signals is well-known to those skilled in the art and thus will not be discussed further.

The audience system divides the digitized input signal into frames, step 420. A bit stream is then generated based on each of these frames, step 430. The bit steam is created by comparing the digitized signal of each frame to a threshold value and generating a one-bit value representing each frame. If any portion of the sample within a particular frame is greater than the threshold value, then a logical one is generated for the bit stream for that frame. However, if no portion of the sample within a particular frame is greater than the threshold value, then a logical zero is generated for the bit stream for that frame.

The audience system then determines the response received based on the bit stream, step 440. Periods of the bit stream which are a logical one indicate potential periods of applause. The system determines whether applause was actually received based on the duration of periods of the bit stream which are a logical one. This process is discussed in more detail below with reference to FIG. 6.

Figure 5:
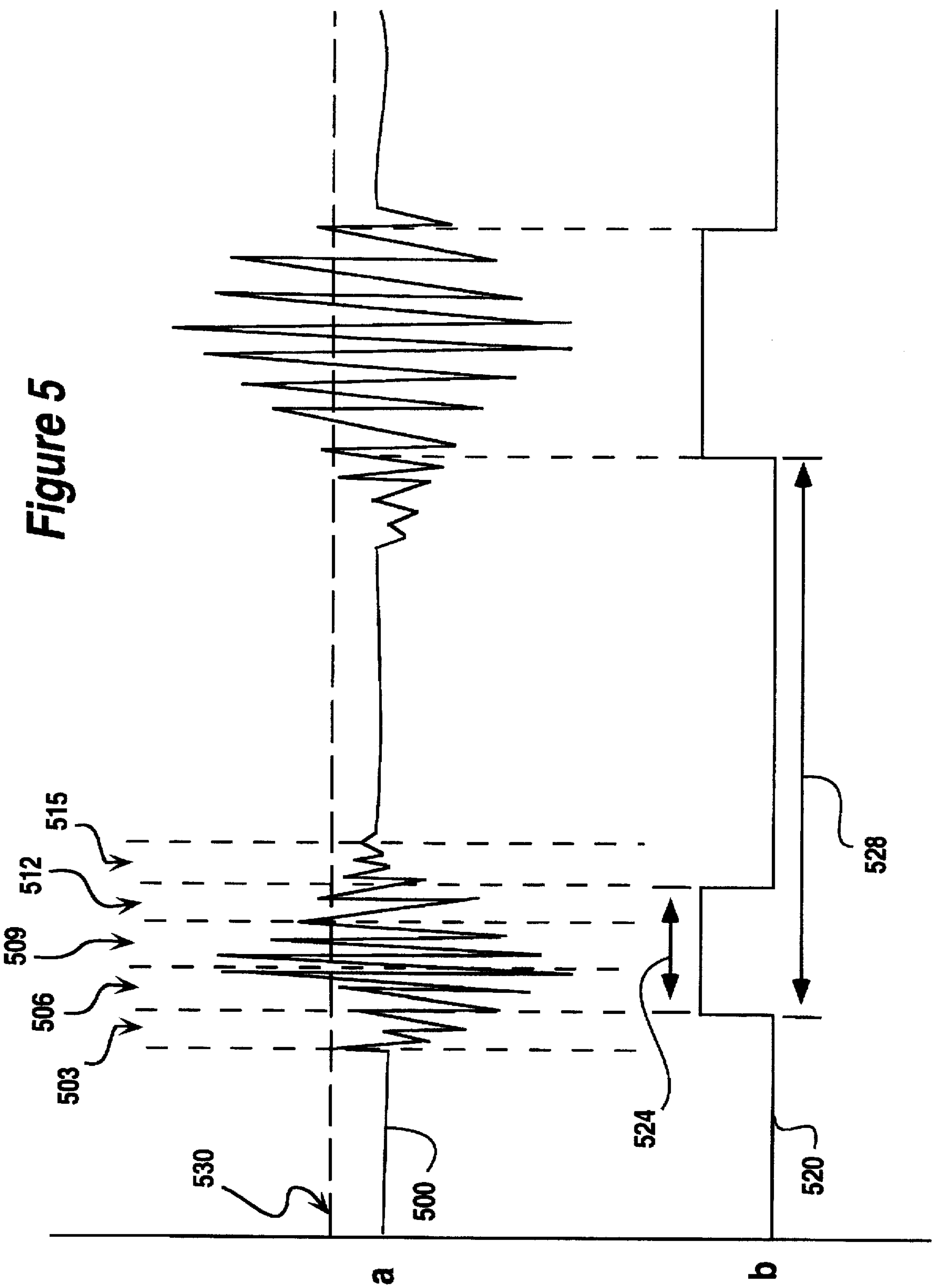
FIG. 5 shows an example of a digitized input signal and a bit stream generated by the audience system.

FIG. 5 shows an example of a digitized input signal and a bit stream generated by the audience system. Digitized input signal 500(*a*) and corresponding bit stream 520(*b*) are shown. In one embodiment of the present invention, the audience system generates digitized input signal 500 by sampling the analog input signal at a frequency of 11,000 samples per second.

Five frames are shown as frames 503, 506, 509, 512 and 515. It is to be appreciated, however, that the entire signal 500 is divided into frames of equal duration. In one embodiment, the frame duration is determined by selecting the lowest-frequency signal which appears as a signal rather than as a pulse. In one implementation, this frequency is 60 Hz, resulting in a frame duration of 16 ms. However it is to be appreciated that other embodiments can have different frame durations.

Bit stream 520 is generated by comparing each of the frames of input signal 500 to threshold 530. If a portion of signal 500 for a particular frame exceeds threshold 530, then a logical one is generated for the bit stream for that particular frame. Otherwise, a logical zero is generated. Thus, as shown in FIG. 5, a logical zero is contained in the bit stream for frames 503 and 515, and a logical one is contained in the bit stream for frames 506, 509 and 512. In one embodiment of the present invention, the value of threshold 530 is chosen empirically to reject background noise. In one implementation, the value of threshold 530 is one-quarter of the maximum anticipated input signal amplitude.

The audience system determines whether a portion of the input to the system is applause by determining whether that portion of the input sound corresponds to an individual's clap. Whether the portion is a clap is determined by checking the pulse width and pulse period of that portion of the bit stream. Bit stream 520 shows a pulse 524 having a width of three frames. In one embodiment, the maximum pulse width for a clap is five frames.

The pulse period is defined as the period between the beginning of two pulses, shown as period 528 in FIG. 5. In one embodiment, the minimum pulse period for a clap is determined based on the maximum number of claps per second to be recognized. The minimum pulse period in number of frames is determined according to the following formula:

$$\text{minimum pulse period} = \frac{1000}{x \cdot y}$$

where x is the maximum number of claps per second to be recognized and y is the frame duration in milliseconds. In one implementation, the minimum pulse period is seven frames.

In one embodiment, the maximum pulse period is determined based on the minimum number of claps per second. The maximum pulse period in number of frames is determined according to the following formula:

$$\text{maximum pulse period} = \frac{1000}{a \cdot b}$$

where a is the minimum number of claps per second to be recognized and b is the frame duration in milliseconds. In one implementation, the maximum pulse period is thirty-one frames.

Figure 6:
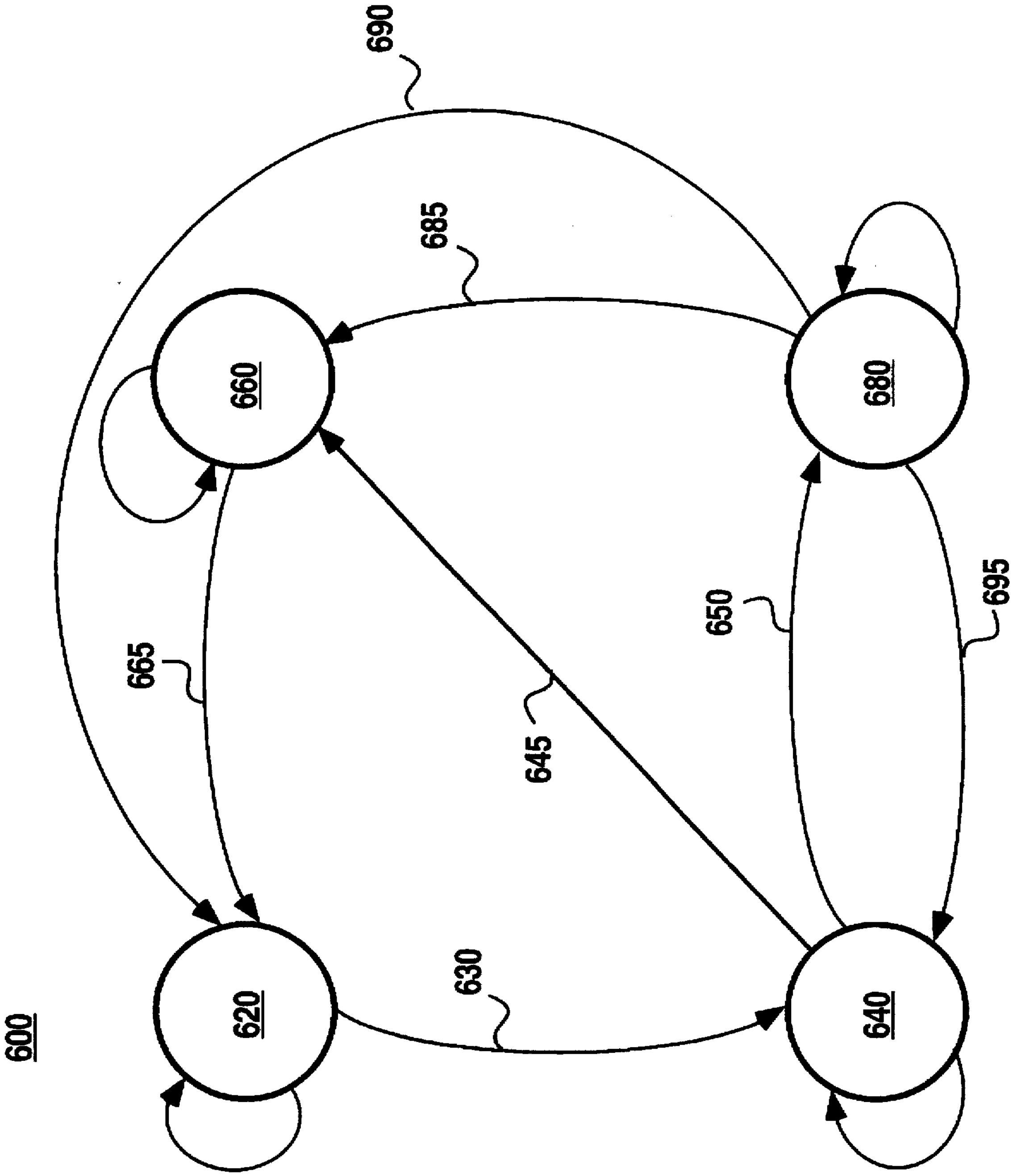
FIG. 6 shows a state diagram used to determine whether a portion of the input signal is a clap according to one embodiment of the present invention.

FIG. 6 shows a state diagram used to determine whether a portion of the input signal is a clap according to one embodiment of the present invention. State diagram 600 begins in state 620. The system remains in state 620 until the digitized input signal exceeds threshold 530 of FIG. 5. Once the signal exceeds threshold 530, the system transitions to state 640 via transition arc 630.

Once the system transitions to state 640, the system maintains a count of the number of consecutive frames which exceed the threshold level. If the number of consecutive frames which exceed the threshold level 530 (that is, the pulse width) is greater than the maximum pulse width, then the system transitions to state 660 via transition arc 645. The input pulse width being greater than the maximum pulse width indicates that the input sound has a pulse too long to be a clap, and thus should not be recognized as a clap. The system then remains in state 660 until the input signal no longer exceeds the threshold level. At this point, the system returns to state 620 via transition arc 665.

However, in state 640, if the input signal drops below the threshold level and the pulse width is less than the maximum pulse width, then the system transitions to state 680 via transition arc 650. Once in state 680, the system determines whether the input sound is a clap based on the pulse period. If the pulse period is either too short (that is, less than the minimum pulse period) or too long (that is, greater than the maximum pulse period), then the input sound is not recognized as a clap. If the pulse period is less than the minimum pulse period, then the system transitions to state 660 via transition arc 685 and remains in state 660 until the input signal drops below the threshold level. If the pulse period is greater than the maximum pulse period, then the system transitions to state 620 via transition arc 690.

If, however, the pulse period is between the minimum and maximum pulse periods, then the system transitions to state 640, via transition arc 695, and records a single clap as being received. Once in state 640, the system continues to check whether subsequent input sounds represent claps, and records claps as being received when appropriate.

In one embodiment of the present invention, the methods discussed in FIGS. 4 and 6 are a continuous process. That is, the system continuously checks whether input sounds received are a clap. For example, the system transitions to state 640 of FIG. 6 from state 620 as soon as the input signal for a frame exceeds the threshold level. This transition occurs without waiting to receive the entire pulse period.

Figure 7:
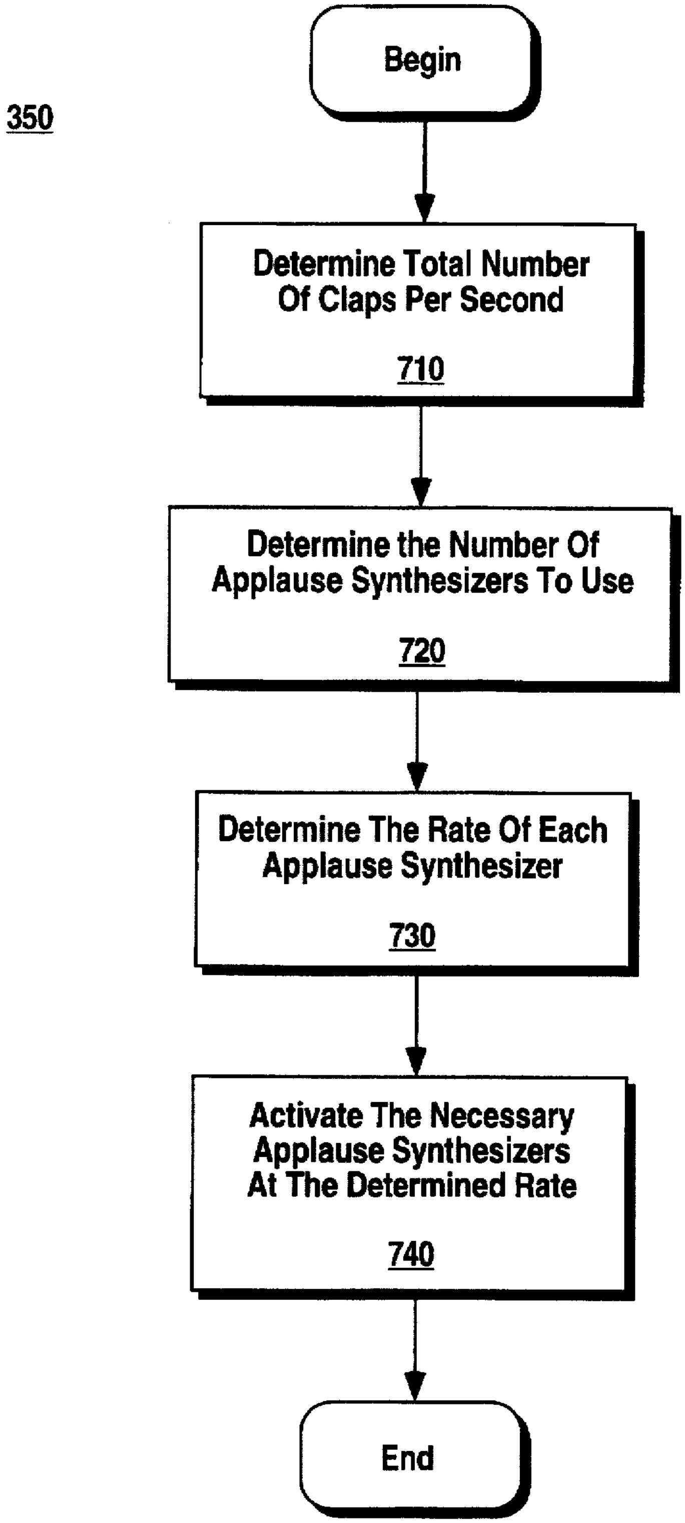
FIG. 7 is a flowchart showing the steps followed in generating synthesized applause.

FIG. 7 is a flowchart showing the steps followed in generating synthesized applause. It is to be appreciated that although FIG. 7 discusses applause, other types of synthesized audience responses can be generated in an analogous manner. In one embodiment of the present invention, FIG. 7 shows step 350 of FIG. 3 in more detail.

The computer system generating the synthesized applause first determines the total number of claps per second which should be synthesized, step 710. In one embodiment, the total number of claps per second is indicated by the combined response metric generated in step 340 of FIG. 3.

The system then determines the number of applause synthesizers to activate, step 720. An applause synthesizer is a series of software routines which produces an audio output which replicates applause. In one embodiment, the system utilizes up to eight applause synthesizers to produce an audible applause output. Each of the applause synthesizers has a variable rate.

The rate of each applause synthesizer is then determined in step 730. In one embodiment, each applause synthesizer can be set to simulate between zero and eight claps per second. The rate of each applause synthesizer is determined based on the total number of claps per second which was determined in step 710. In one implementation, the minimal number of applause synthesizers is used to simulate the total number of claps per second. In this implementation, the minimal number of applause synthesizers are set at their maximum rates, and a single applause synthesizer is set at a rate to achieve the total number of claps per second. For example, if the total number of claps determined in step 710 was thirty-eight, then four applause synthesizers would be set at a rate of eight claps per second, one applause synthesizer would be set at a rate of six claps per second, and the remaining applause synthesizers would be set at a rate of zero claps per second.

The system then activates the necessary applause synthesizers at the appropriate rates, step 740. Activating the applause synthesizers results in an audible output of applause. In one embodiment of the present invention, each applause synthesizer provides the audible output of a clap by providing digital audio data (e.g., a waveform stored in a digital format) representing a clap to an output device, such as a speaker. Hardware within the system, such as signal generation device 237 of FIG. 2, transforms the digital audio data to audio signals for the speaker. The applause synthesizer can produce multiple claps per second by providing the audio data to the output device multiple times per second.

In one embodiment of the present invention, each applause synthesizer provides an amount of randomness to the applause output in order to provide a more realistic-sounding audible output. This is accomplished in part by storing a set of waveforms which represent a range of pitches and durations of single claps. Then, when an applause synthesizer is to provide audio output for a clap, the synthesizer randomly selects one waveform from this set of waveforms. Alternatively, the applause synthesizer may utilize the same waveform for all claps and randomly modify the time required to output the audio data (that is, randomly vary the time the synthesizer takes to traverse the waveform for the clap).

In addition, a random variable is also used by each applause synthesizer when it is outputting more than one clap per second. This second random variable provides a random timing between each of the multiple claps. In one implementation, the delay between outputting two claps is 80 ms plus or minus a randomly generated 1 to 20 ms.

In one embodiment, the present invention is implemented as a series of software routines run by the computer system of FIG. 2. In one implementation, these software routines are written in the C++ programming language. However, it is to be appreciated that these routines may be implemented in any of a wide variety of programming languages. In an alternate embodiment, the present invention is implemented in discrete hardware or firmware.

Thus, the present invention provides a method and apparatus which simulates the responses of an audience. The audience can be physically distributed over a wide geographic area. The audience response is provided in a low-bandwidth manner to the broadcasting system, which produces the audience response for the presenter to hear. The broadcasting system can also include the audience response in the presentation, thereby providing the response for all audience members to hear. In addition, the audience response may be provided to all other audience systems when it is provided to the broadcasting system, thereby allowing each audience system to generate the audience response for all audience members locally.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for simulating the responses of a physically-distributed audience has been described.

What is claimed is:

1. A method of simulating the responses of a physically-distributed audience, the method comprising the steps of:

a) repeatedly monitoring an input;

b) automatically recognizing an audience response at the input;

c) generating a response metric having a value based on the recognized audience response;

d) transferring the response metric to a broadcast system;

e) generating a combined response metric based on the response metric; and f) repeatedly producing audio feedback by activating a response synthesizer based on the combined response metric.

2. The method of claim 1, wherein the monitoring step a) comprises the step of repeatedly monitoring an audio input received from the audience.

3. The method of claim 1, wherein the generating step e) comprises the step of generating the combined response metric by combining a plurality of response metrics.

4. The method of claim 1, further comprising the step of receiving a plurality of response metrics at periodic intervals from a plurality of physically-distributed audience systems.

5. A method of automatically simulating the responses of a physically-distributed audience, the method comprising the steps of:

a) repeatedly monitoring an audio input;

b) automatically recognizing applause at the input;

c) repeatedly generating a response metric having a first value responsive to the applause being recognized, otherwise generating the response metric having a second value;

d) automatically transferring, at periodic intervals, the response metric to a broadcast system;

e) generating a combined response metric based on the response metric; and f) repeatedly producing audio feedback by activating a response synthesizer based on the combined response metric.

6. The method of claim 5, wherein the producing step f) comprises the steps of:

determining a number of applause synthesizers to activate;

determining a rate for each of the number of applause synthesizers; and activating each of the number of applause synthesizers according to the rate of each of the number of applause synthesizers.

7. An apparatus for automatically simulating the responses of a physically-distributed audience comprising:

means for repeatedly monitoring an input;

means operative to automatically recognize an audience response;

means for generating a response metric having a first value responsive to the audience response being recognized, otherwise generating the response metric having a second value;

means for transferring the response metric to a broadcast system;

means for generating a combined response metric based on the response metric; and means for producing audio feedback by activating a response synthesizer based on the combined response metric.

8. The apparatus of claim 7, wherein the means for repeatedly monitoring an input including means for monitoring an audio input received from the audience.

9. The apparatus of claim 7, wherein the means for generating a combined response metric generates the combined response metric by combining a plurality of response metrics.

10. The apparatus of claim 7, further comprising means for receiving a plurality of response metrics at predetermined intervals from a plurality of physically-distributed audience systems.

11. The apparatus of claim 7, wherein the audience response is applause, and wherein the input is an audio input.

12. The apparatus of claim 7, wherein the means for producing audio feedback comprises:

means for determining a number of applause synthesizers to activate;

means for determining a rate for each of the number of applause synthesizers; and means for activating each of the number of applause synthesizers according to the rate of each of the number of applause synthesizers.

13. A system which simulates audience response comprising:

a plurality of audience systems;

a broadcast system;

a communication link coupled to each of the plurality of audience systems and the broadcast system;

wherein the broadcast system is operative to provide an audio broadcast to the plurality of audience systems via the communication link, and wherein the broadcast system is also configured to receive a response metric from a first audience system of the plurality of audience systems and to repeatedly generate an audio feedback based on the response metric; and wherein the first audience system is configured to repeatedly monitor an input in order to automatically recognize an audience response, and to generate the response metric having a value based on whether the audience response is recognized.

14. The system of claim 13, wherein the broadcast system is also configured to incorporate the audio feedback into the audio broadcast.

15. The system of claim 12, wherein each of the plurality of audience systems is configured to provide, at predetermined intervals, a response metric to the broadcast system.

16. The system of claim 15, wherein the broadcast system is also configured to combine the response metrics from each of the plurality of audience systems and generate the audio feedback based on the combined response metrics.

17. An apparatus for simulating audience feedback in a physically-distributed system comprising:

a storage device;

an output device; and a processor coupled to the storage device and the output device, the processor operative to repeatedly monitor an input to automatically recognize an audience response, to generate a response metric based on whether the audience response is recognized, and to transfer the response metric to a broadcast system.

18. The apparatus of claim 17, wherein the processor is also configured to repeatedly monitor an audio input received from the audience.

19. An apparatus for simulating audience feedback in a physically-distributed system comprising:

a memory device;

an output device; and a processor coupled to the memory device and the output device, wherein the processor is operative to repeatedly generate a response metric which indicates applause, to transfer, at predetermined intervals, the response metric to a broadcast system, and to repeatedly monitor an audio input in an attempt to automatically recognize the applause and to generate the response metric having a first value responsive to the applause being recognized, otherwise generating the response metric having a second value.

20. The method of claim 1, wherein the monitoring step a) comprises the step of repeatedly monitoring the input to recognize applause.

* * * * *

UNITED STATES PATENT AND TRADEMARK OFFICE

CERTIFICATE OF CORRECTION

PATENT NO. : 5,726,701

DATED : March 10, 1998

INVENTOR(S) : Bradford H. Needham

It is certified that error appears in the above-identified patent and that said Letters Patent is hereby corrected as shown below:

Title page, item [54] and col. 1, line 2, delete "STIMULATING" and insert--SIMULATING--

Signed and Sealed this

Ninth Day of June, 1998

Attest:

Bruce Lehman

BRUCE LEHMAN

*Attesting Officer*

*Commissioner of Patents and Trademarks*